US005805208A

United States Patent [19]
Meierdiercks

[11] Patent Number: 5,805,208
[45] Date of Patent: Sep. 8, 1998

[54] POSITIONING SYSTEM TIMING SYNCHRONIZATION

[75] Inventor: John Daniel Meierdiercks, Henrietta, N.Y.

[73] Assignee: Eastman Kodak Company, Rochester, N.Y.

[21] Appl. No.: 654,955

[22] Filed: May 29, 1996

Related U.S. Application Data

[60] Provisional application No. 60/004,500 Sep. 29, 1995.

[51] Int. Cl.[6] .......... H04N 3/40
[52] U.S. Cl. .......... 348/97; 348/98
[58] Field of Search .......... 348/96, 97; 355/53; 358/498; H04N 3/40

[56] References Cited

U.S. PATENT DOCUMENTS

| | | | |
|---|---|---|---|
| 3,942,124 | 3/1976 | Tarczy-Hornoch | 328/63 |
| 4,999,526 | 3/1991 | Dudley | 307/269 |
| 5,081,477 | 1/1992 | Gibson | 346/160 |
| 5,105,270 | 4/1992 | Takahashi et al. | 358/113 |
| 5,252,977 | 10/1993 | Lueker et al. | 341/182 |
| 5,341,225 | 8/1994 | Stein et al. | 358/498 |
| 5,343,270 | 8/1994 | Sakakibara et al. | 355/53 |
| 5,469,209 | 11/1995 | Gunday et al. | 348/96 |
| 5,541,644 | 7/1996 | Nanba | 348/96 |

*Primary Examiner*—Howard Britton
*Attorney, Agent, or Firm*—Gordon M. Stewart

[57] ABSTRACT

In an apparatus having a clock and a movable stage, a method of synchronizing the occurrence of the stage reaching a target velocity or target location with the clock signal, comprising:

a) determining the clock period;

b) before beginning movement of the movable stage, for a first relative time in the clock cycle, determining a calculated relative time of the target velocity or target location;

c) if the calculated relative time differs from a predetermined second relative time in the clock cycle, then adding a delay commencing at the first relative time before beginning movement of the movable stage which moves the actual occurrence of the target velocity or target location to another relative time.

3 Claims, 3 Drawing Sheets

POSITIONING SYSTEM TIMING SYNCHRONIZATION

CROSS REFERENCE TO RELATED APPLICATION

Reference is made to and priority claimed from U.S. Provisional application Ser. No. 60/004,500, filed 29 Sep., 1995, entitled POSITIONING SYSTEM TIMING SYNCHRONIZATION.

FIELD OF THE INVENTION

This invention relates to a method for bringing a movable stage in an apparatus up to a target speed at a desired relative time in a clock cycle of the apparatus. The invention particularly relates to scanners where the movable stage moves an image or a sensor relative to one another.

BACKGROUND OF THE INVENTION

Conversion of analog images into digital data has become widespread for a variety of applications, including storing, manipulating, transmitting and displaying or printing copies of the images. For example, in the case of motion picture film in particular, the digital data representing images from successive frames frame is often manipulated to produce special effects or to otherwise enhance or recover the images.

Typically, in capturing the photographic image digitally, an image frame of a motion picture is scanned with a light beam or line, and the light transmitted through the image is passed through a color filter array and is detected, typically as three primary color light intensity signals. Each primary color falls on a single line CCD sensor, and the resulting sensor data is digitized. The digitized data may be stored on any suitable storage media, such as a writeable optical disk, or magnetic media. Following manipulation of the images as desired, each modified image frame is then reprinted onto a blank motion picture film. Film digitizers may take a variety of forms and the various common aspects of film digitizing, particularly line illumination and linear CCD-based digitizers, are described in greater detail in commonly assigned U.S. Pat. No. 5,012,346.

While scanners of such a type perform well in scanning motion picture films, in some situations a second physical line in an image frame could be stored digitally as the first line. In this situation, without subsequent correction of the stored images, a film onto which the digitally stored images are rewritten could exhibit jitter between frames. This is so since one frame could be rewritten with the original first physical line placed correctly at a first line position in the rewritten film. However, a next adjacent frame may have the original second physical line rewritten incorrectly in the position where the first physical line should have been rewritten. In other motion picture films scanners, one technique for correcting this problem is to use "top of frame" sensors and associated hardware, this increases the complexity and cost of the scanner.

It would be desirable then, to reduce or eliminate the possibility of adjacent image frames in a motion picture film to be scanned, having differing image frame lines being assigned in the scanner as being in the same location in their respective image frames. It would further be desirable if the first image frame line of each image was relatively consistently assigned by the scanner as the first image frame line, and that these goals be accomplished without the need for complex or expensive hardware. More generally, it would further be desirable that in any apparatus having a clock and a movable stage which must be brought up to a target velocity or location, that the target could be consistently reached at a given relative time in the clock cycle.

SUMMARY OF THE INVENTION

The present invention provides generally, in an apparatus having a clock and a movable stage, a method of synchronizing the occurrence of the stage reaching a target velocity or target location with the clock signal. The method comprises:

a) determining the clock period;

b) before beginning movement of the movable stage, for a first relative time in the clock cycle, determining a calculated relative time of the target velocity or target location;

c) if the calculated relative time differs from a predetermined second relative time in the clock cycle, then adding a delay commencing at the first relative time before beginning movement of the movable stage which moves the actual occurrence of the target velocity or target location to another relative time.

The other relative time to which the actual occurrence of the target velocity or target location is moved could be, for example, a time equal to or within the second relative time (if the second relative time is a range), or away from the second relative time depending upon the end application. In the particular case of a scanner, as described below, the other relative time is outside a window of a clock cycle transition (i.e. the second relative time in such case is the window about the clock transition).

It will be understood, of course, that movement of the movable stage would then be commenced at the first relative time plus the delay.

The predetermined second relative time may particularly be a predetermined window around the occurrence of the transition in the clock period. In this case, the delay added commencing at the first relative time before beginning movement of the movable stage, moves the actual occurrence of the target velocity or target location outside the window. Alternatively, the predetermined second relative time may be the relative time at which the actual occurrence of the target velocity or target location was reached in a previous cycle of movement of the movable stage (which may also have been calculated). In this latter case, it can be ensured that the actual occurrence of the target velocity or target location occurs at the same relative time in each cycle whenever movement of the movable stage is commenced (for example, in the reaching of the target velocity or target location in scanning a number of frames in a motion picture film).

The foregoing "transition" in a clock period or cycle, can be any location in a cycle with which it is desired to ensure does not occur at, or within a window of, the target speed or target location. Preferably, a leading edge of the clock cycle is used as the transition.

In the method, one way of determining the calculated occurrence of the target velocity or target location in relation to a transition in the clock period, is by:

(i) determining as the ramp time the time required for the movable stage to reach the target velocity or target location;

ii) calculating the integer number of clock periods that would occur during the ramp time;

iii) multiplying the integer number of clock periods by the clock period; and iv) subtracting the value obtained in step (iii) from ramp time obtained in step (i).

The delay added may move the actual occurrence of the target velocity or target location only a fraction of a cycle from where it would otherwise occur, or a plurality plus a fraction of cycles.

The method of the present invention is particularly applied to a scanner having a sensor, such as a linear CCD array, timed by the clock and in which the movable stage moves a film frame or the sensor relative to one another, for line by line scanning of the frame. Particularly, the same transitions in the clock period can be used to cause the CCD sensor data to be read into a memory as a scanned line provided a datapath between the sensor and memory is in an open state. In this case, when the actual occurrence of the target velocity or target location is reached the datapath is changed from a closed state to the open state. This should preferably occur in coincidence with the CCD sensor being in alignment with a first line of the image to be scanned, to ensure that the fist line of the image is not missed for scanning.

An apparatus for carrying out the above general method is also provided, wherein the movable stage is moved to a target velocity or target location by a motor. A synchronizer, which is preferably a software implementation on a processor, is used to synchronize the occurrence of the stage reaching a target velocity or target location with the clock signal. The synchronizer has: (i) means for determining the clock period; (ii) means for determining, for a relative time in the clock cycle before beginning movement of the movable stage, a calculated occurrence of the target velocity or target location in relation to a transition in a clock period; (iii) means for comparing the difference with a predetermined window around the occurrence of the transition in the clock period and, if the difference is within the window, then adding a delay commencing at the first relative time before beginning movement of the movable stage, which moves the actual occurrence of the target velocity or target location outside the window. All of these means are preferably computer readable program code means embodied in a computer usable medium of a computer program product (such as a memory chip, or magnetic tape or disk, or an optical disk). A scanner essentially the same as the foregoing general apparatus, and of the type described above, is also provided which can implement the above described scanner methods.

The present invention then, allows for precise synchronization of a fixed or variable speed positioning system with a fixed or variable period free running clock, without additional hardware. Furthermore, the occurrence of a target speed or target location with a transition (such as a leading edge) in the clock signal can be avoided. Particularly in a scanner for scanning motion picture films, this will reduce the chance of different lines of different frames being allocated and stored as a first line, with resultant jitter in a film reprinted from the stored digital images. These features are particularly important where the free running clock frequency may vary, or the acceleration profile of the movable stage may vary.

DRAWINGS

Embodiments of the invention are described below with reference to the Figures, in which.

EMBODIMENTS OF THE INVENTION

Figure 1:
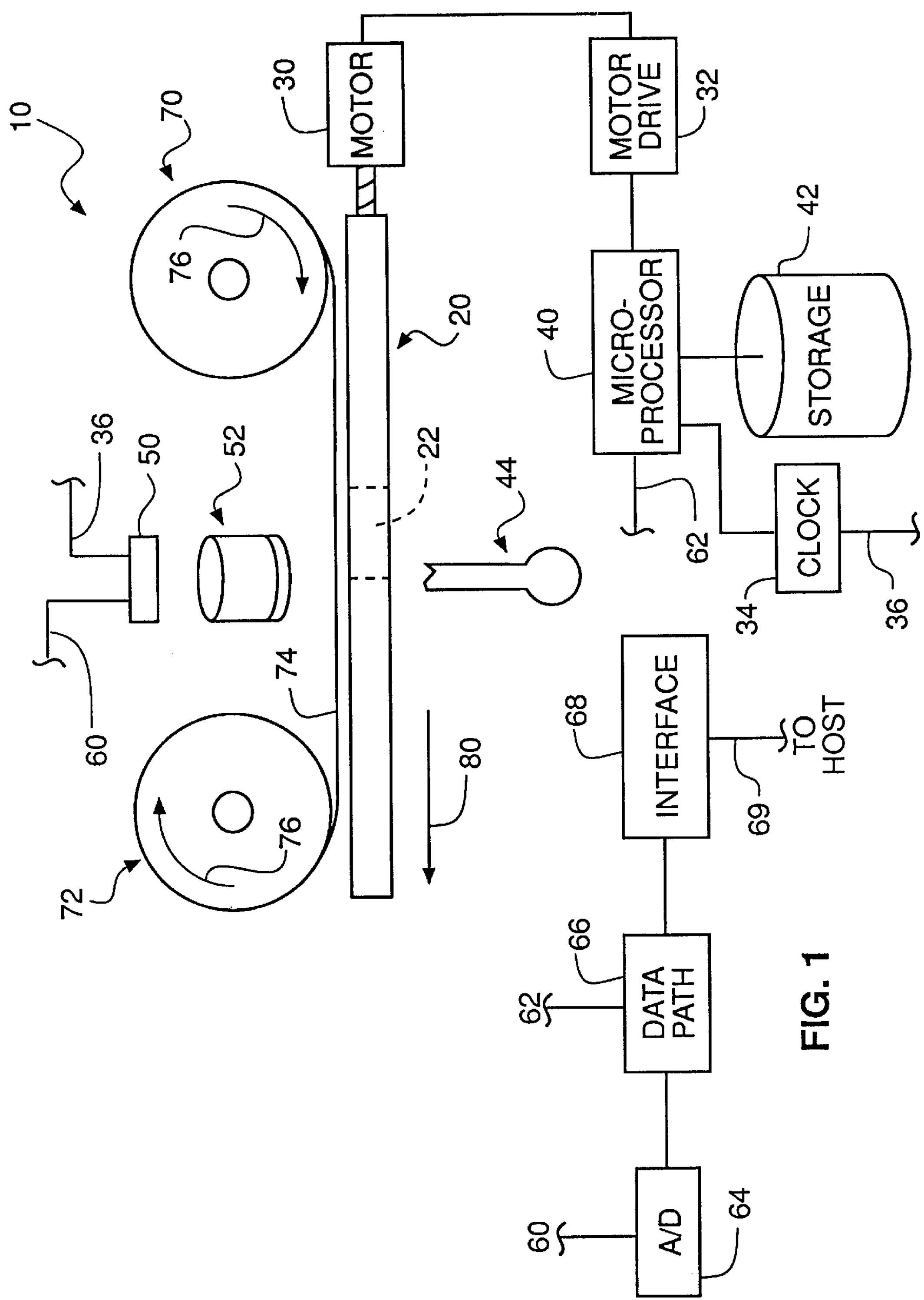
FIG. 1 is a schematic view of a motion picture scanner which is adapted to be an apparatus of the present invention and on which the present invention is implemented.

Referring to FIG. 1, the motion picture film scanner shown is generally designated by reference numeral 10. A horizontal translation stage 20 is driven both left and right in FIG. 1 by stepper motor 30, driven by motor drive 32 under command of appropriately programmed microprocessor 40. The programming can be on any suitable computer readable medium, such as random access memory (RAM), read-only memory (ROM), or diskette or other storage device (RAM being preferred). Translation stage 20 has an aperture 22 which is typically slightly greater in size than a single image frame encountered on a motion picture film 74 to be scanned. The aperture size may be variable which will also require variations in scanning speed.

Film 74 leaves input reel 70 and is advanced to uptake reel 72 for advancing a next frame over aperture 22 for scanning, by rotating them in the direction of arrows 76 (or in the opposite direction) with suitable motor (not shown). When a frame of film 74 is in position over aperture 22 for scanning, it is held in position. The entire stage 20, and reels 70 and 72 which are attached to move with stage 20, is then driven by stepper motor 30 to the left (in the direction of arrow 80) or right. In this manner light from a light source 44 will shine through aperture 22 and the image frame. FIG. 1 shows translation stage 20 in a position shortly before scanning of an image frame begins (i.e. light source 44 is not yet shining through aperture 22 and the image frame aligned therewith; this is assuming movement of stage 20 to the left for scanning). The light is received through a lens system 52 by a linear CCD ("Charge Coupled Device") array 50 which has suitable filters and a trilinear CCD, so that each line of the CCD receives one primary color. The signal corresponding to each line in the scanned image is sent over line 60 for digitizing by A/D board 64, then through datapath board 66 (only when the datapath is open) and interface 68 then out to a host computer (for further processing and storage) through line 69. The datapath is opened or closed under control of microprocessor 40 through line 62.

Figure 2:
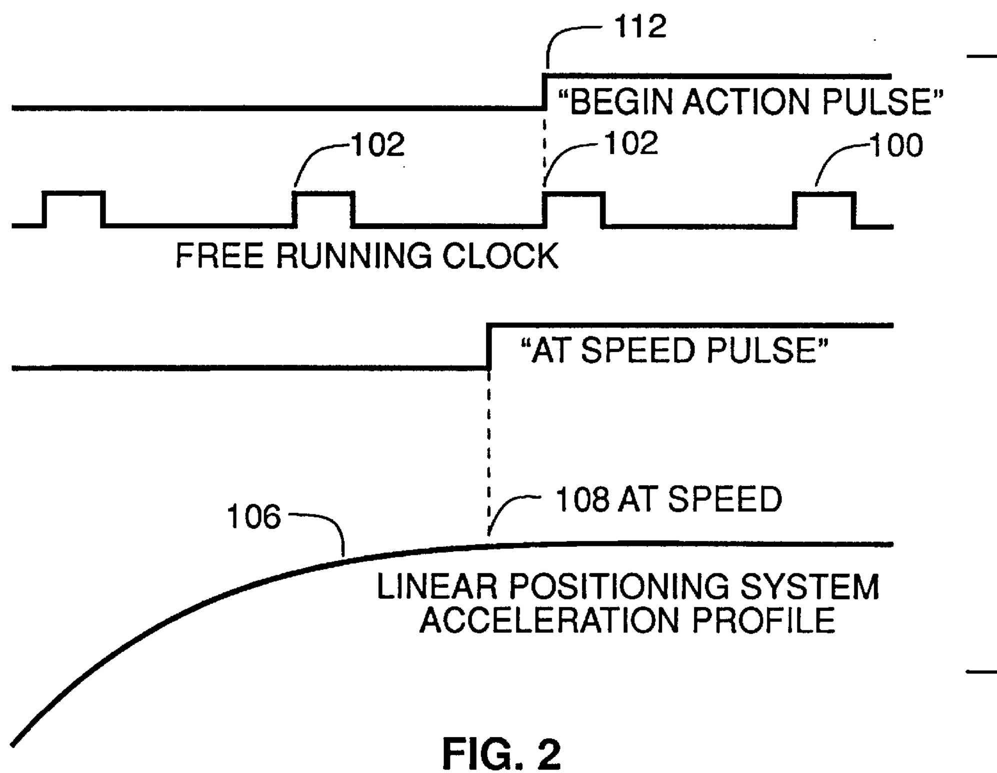
FIGS. 2–4 are signal timing diagrams in the method by which the apparatus of FIG. 1 was operated in the prior art.

Scanner 10 also has a free running clock 34 which generates a periodic pulse signal such as signal 100 shown in FIG. 2. In scanner 10, the leading edge 102 of the free running clock signal 100 is used as a new line indicator to CCD array 50 so that the data then in the CCD array 50 is sent to A/D board 64. However, for correct assignment of data to a new line, translation stage 20 must be moving at the necessary speed prior to the first line of the image frame to be scanned reaching the CCD array 50. To accomplish the foregoing, scanner determines when translation stage 20 will be at the necessary speed (i.e. a "target speed") and correctly positioned (i.e. a "target position") before the beginning of the image frame is reached. This is done by microprocessor 40 which accesses stored data in storage 42 on an acceleration profile 106 of translation stage 20 (usually lookup tables) under influence of motor 30. The particular acceleration profile used will depend on the final speed of translation stage 20 desired (which may vary depending upon the exposure desired for a particular image frame or the size of the aperture used). Microprocessor 40 can then calculate at what time after motor 30 is energized, when translation stage 20 will be at the target speed and target location. This time is designated the "at speed" time (although it represents both reaching the target velocity and the target location).

When this calculated time has elapsed after acceleration of translation stage 20 has begun, this is represented by an "at speed" point 108 on acceleration profile 106 and an "at speed" signal 110 as shown in FIG. 2 (although in the preferred embodiment this is simply tracked by the software). At the next occurrence of a leading edge 102 (this next occurrence being represented by a "begin action pulse" 112 in FIGS. 2–4), datapath 66 is then opened which causes image data from CCD array 50 and A/D board 64 to pass through datapath 66 and interface 68 to the host computer. Different target speeds of translation stage 20 may be used for different film frames in order to obtain different levels of exposure or to compensate for aging of the light source 44 or different apertures. Thus, the point at which the target velocity is derived from a location in the lookup table. Using lookup tables and stepper motors in this way, is a known technique described, for example, in "The Art and Practice of Step Motor Control" by Albert C. Leenhouts (publisher Intertec Communications Incorporated, Ventura, Calif.) 1987 and accompanying software.

A difficulty with the foregoing arrangement though, is that the translation stage 20 may be at the target speed and target location at a time near a leading edge 102 of the clock pulse. Since the clock 34 is not synchronized with the movement of the translation stage 20, when at speed 108 is reached the clock leading edge 102 and hence opening of data path 66, may occur almost immediately or be delayed by up to one period of clock 34. Thus, opening of data path 66 may occur up to one physical line later. This results in unstable frame to frame variations in which the first line scanned may or may not be the first physical line in the image. A motion picture film reprinted from such a series of scanned images and projected onto a screen, will exhibit jitter.

Furthermore, if the clock frequencey is varied to alter CCD integration time (which would also require decreasing the target speed) between rolls of motion picture film to maintain the same exposure because light source 44 has aged, there may be a variation of up to one clock cycle before data is processed from CCD array 50 as already discussed.

It will be seen that the same problem can arise in any positioning system with a movable stage and a clock, where it is desired to synchronize the occurrence of a moveable stage reaching a target velocity or target location with the clock signal. Furthermore, synchronizing the free running clock signal 100 with the beginning of movement of a movable stage (such as translation stage 20), is helpful in systems where the free running clock is fixed and the acceleration profile is fixed. However, as already mentioned, in the case of motion picture film scanning the acceleration profile 106 and clock frequency may not be fixed.

Figure 3:
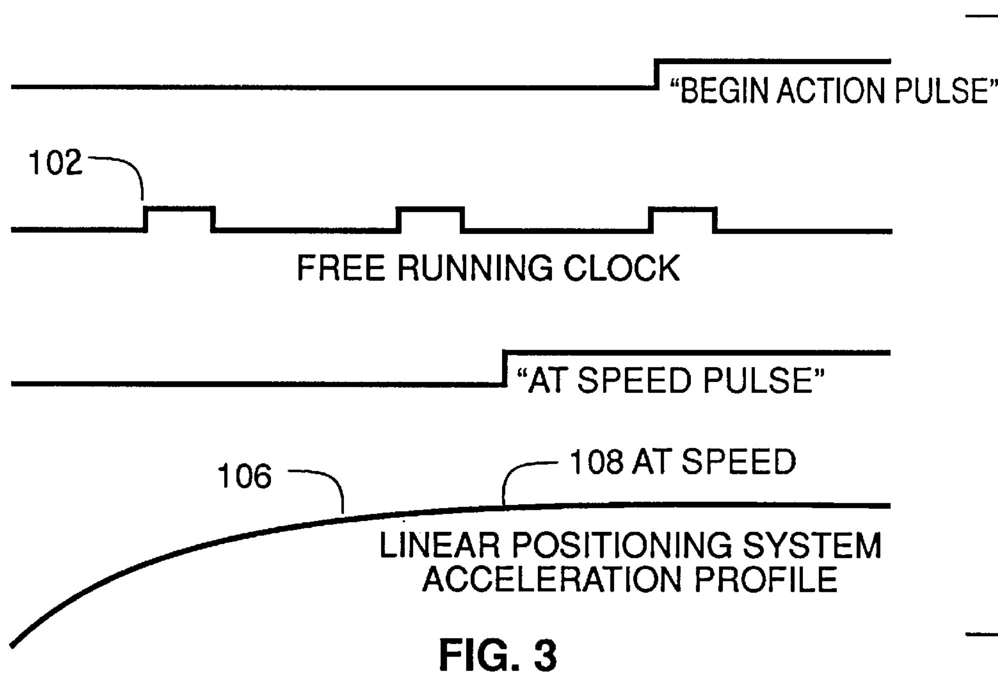
Figure 4:
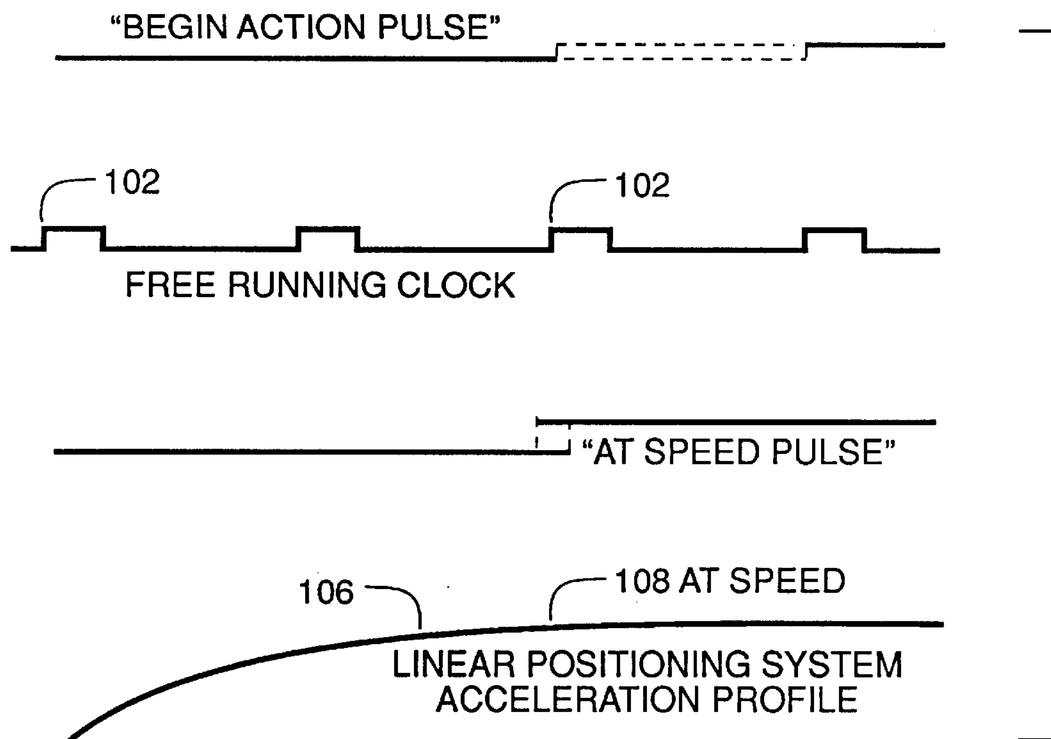

These problems can be seen from FIGS. 2–4 in particular. In some situations the begin action pulse 112, such as accepting a line of data from CCD array 50, might start almost immediately following the "at speed pulse" as in FIG. 2. However, in other cases the same action may not begin until up to a complete clock cycle has elapsed following the "at speed pulse", as shown in FIG. 3. Even worse is the situation shown in FIG. 4, where any variation in acceleration profile 106 will cause the action to start almost immediately as in FIG. 2 or almost a complete clock cycle later as in FIG. 3. As already mentioned, these situations cause a variation in the displacement of the positioning system (e.g. the translation stage) at the time when the "begin action pulse" (such as process a first line of data from CCD array 50) is asserted. The location of the begin action pulse 112 for a relative time in the clock cycle, becomes harder to predict when the free running clock speed is variable, and the linear positioning system's final velocity is variable. By "relative time" in this context, is meant the time along any given cycle in relation to the beginning of that cycle.

Figure 5:
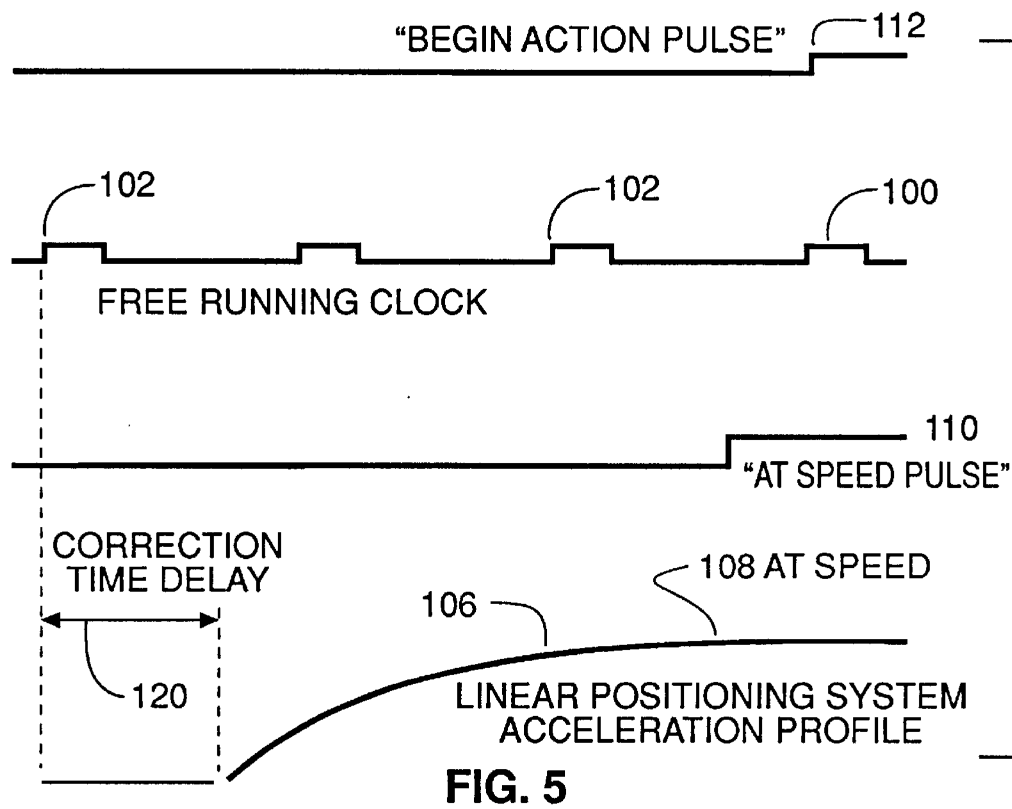
FIG. 5 is a timing diagram illustrating the method of the present invention.

In the method of the present invention, before any movement of translation stage 20 begins, the programming in microprocessor 40 causes it to calculate the time duration needed to achieve the linear positioning system's "at speed" point. It then calculates, for a first relative time in the clock cycle (preferably the leading edge such that first relative time is time 0), where a transition (preferably the leading edge of the clock cycle) in the free running clock will be (number of full and fractional periods) relative to the "at speed" point 108. This is accomplished by microprocessor 40 accessing a stored value of the clock frequency, or calculating or measuring it if the clock is variable. If the timing where "at speed" 108 occurs is undesirably close to where the transition occurs (i.e. "at speed" occurs within a predetermined window of the transition (for example, within 20% of the clock period), then microprocessor 40 calculates an amount of delay needed, waits for the first relative time in a free running clock cycle (again, preferably the active edge), and applies the time delay before starting acceleration of stage 20 up profile 106 in order to position the "at speed" point 108 correctly (i.e. outside the predetermined window) as shown in FIG. 5.

In more detail, the sequence of events performed by microprocessor 40 is as follows:

1) Determine, by calculation, measurement or stored value, the period of the free running clock 34 to be used during scanning.
2) Calculate as the ramp time, the time from starting movement of translation stage 20 to reach the "at speed" point 108. The ramp time generally consists of time delays between microsteps of stepper motor 30 and code execution time. The resulting acceleration has a profile such as acceleration profile 106 in FIGS. 2–5.
3) Calculate the integer number of free running clock periods that would occur during the ramp time assuming that movement of translation stage 20 is commenced at a first relative time (specifically, the leading edge 102) in the clock cycle.
4) Multiply the integer number of free running clock periods by it's clock period.
5) Subtract the value obtained in step 4 from the total ramp time obtained in step 2. This value is the fractional portion of the current free running clock period where the "at speed" 108 is obtained if movement is started at the first relative time in the clock cycle. This result can be used as is, or used to calculate the percent of the current free running clock period where "at speed" is obtained.
6) The percent of the current free running clock period can be found by dividing the result from step 5 by the free running clock period then multiplying the result by 100.

$$\text{period}=(\text{fractional clock period}/\text{free running clock period})\times 100$$

7) The fractional clock period (or % period) can now be adjusted to a specific fraction (or % period) by inserting a correction delay 120 after waiting for the active edge of the free running clock and before the acceleration ramp begins (see FIG. 5). Note that this is a additive process only. If a smaller fraction of the clock period is desired, by adding additional delay time, the "at speed" pulse can be pushed into the next integer free running clock period. This allows any fractional clock period to be achieved.

It will be appreciated from the above then, that the present invention allows for precise synchronization of a fixed or variable speed positioning system with a fixed or variable period free running clock, without additional hardware.

The preceding examples are set forth to illustrate specific embodiments of this invention and are not intended to limit the scope of the invention. It will be understood that variations and modifications can be effected within the spirit and scope of the invention.

Parts List

Scanner 10
Translation Stage 20
Aperture 22
Motor 30
Motor drive 32
Clock 34
Line 36
Microprocessor 40
Storage Medium 42
Light Source 44
CCD Array 50
Lens System 52
Line 60
Line 62
A/D Board 64
Data Path 66
Interface 68
Line 69
Reels 70 & 72
Film 74
Arrows 76
Arrow 80
Signal 100
Leading Edge 102
Acceleration Profile 106
"At Speed" Point 108
"At Speed" Signal 110
Action Pulse 112
Correction Time Delay 120

I claim:

1. A method for synchronizing the operation of a film transport moving a film to an imager clock so that when the film transport moving the film reaches a scan speed at a scan position, the first and subsequent lines of a film frame on the film can be scanned by a line scanner in synchronization with the imager clock, comprising the steps of:

a) providing a stepper motor to provide relative movement between the line scanner and the film transport to cause the film transport to be at the scan position so that the line scanner can read the first line of the film frame;

b) calculating the time that the stepper motor is to reach the scan speed; and c) delaying the start of the operation of the stepper motor so that when the first line of the film frame is at the scan position and the stepper motor is at the scan speed, the stepper motor is in synchronization with the imager clock.

2. The method of claim 1 wherein the line scanner includes a CCD sensor.

3. The method of claim 1 wherein the delay time is determined as follows:

i) determining a ramp time required for the stepper motor to reach the scan speed;

ii) calculating an integer number of clock periods that would occur during the ramp time and determining the time corresponding to such an integer number; and iii) subtracting, when there is a difference, the integer time from the ramp time to determine the delay time.

* * * * *